United States Patent [19]

Nakae et al.

[11] Patent Number: 5,435,619

[45] Date of Patent: Jul. 25, 1995

[54] AUTOMOBILE DOOR

[75] Inventors: Toshiharu Nakae, Shiga; Fusayoshi Akimaru; Syunji Okubo, both of Ohtsu, all of Japan

[73] Assignee: Toray Industries, Inc., Tokyo, Japan

[21] Appl. No.: 187,141

[22] Filed: Jan. 27, 1994

Related U.S. Application Data

[62] Division of Ser. No. 934,827, Aug. 24, 1992, Pat. No. 5,306,068.

[30] Foreign Application Priority Data

| Aug. 30, 1991 | [JP] | Japan | 3-069332 |
| Jan. 14, 1992 | [JP] | Japan | 4-04782 |
| Apr. 30, 1992 | [JP] | Japan | 4-110934 |

[51] Int. Cl.⁶ .............................................. B60R 21/04
[52] U.S. Cl. .................................. 296/189; 296/146.6
[58] Field of Search ................ 296/146.6, 188, 189; 293/122

[56] References Cited

U.S. PATENT DOCUMENTS

| 3,466,733 | 9/1969 | Pajak et al. | |
| 3,675,746 | 7/1972 | Irvine | |
| 3,868,141 | 2/1975 | Johnson | 296/189 |
| 3,938,288 | 2/1976 | Roubinet | 296/146.6 X |
| 3,964,208 | 6/1976 | Renner et al. | 296/146.6 X |
| 4,029,350 | 6/1977 | Goupy et al. | 293/122 X |
| 4,090,734 | 5/1978 | Inami et al. | 396/146.6 |
| 4,221,413 | 9/1980 | Bonnetain | 293/122 |
| 4,413,856 | 11/1983 | McMahan et al. | 296/189 X |
| 4,838,606 | 6/1989 | Furubayashi et al. | 296/188 |
| 4,948,196 | 8/1990 | Baba et al. | 296/188 |
| 5,033,593 | 7/1991 | Kazuhito | 296/189 X |
| 5,306,066 | 4/1994 | Saathoff | 296/189 X |

FOREIGN PATENT DOCUMENTS

| 990532 | 9/1951 | France . |
| 3621697A1 | 1/1988 | Germany . |
| 48-16074 | 2/1973 | Japan . |
| 3-45421 | 2/1991 | Japan . |
| 978654 | 12/1964 | United Kingdom . |
| 1492752 | 11/1977 | United Kingdom . |

OTHER PUBLICATIONS

Section Ch, Week 9211, Derwent Publications Ltd., London GB.
Patent Abstracts of Japan, vol. 6, No. 10 (M-107), Jan. 21, 1982.

*Primary Examiner*—Joseph D. Pape
*Attorney, Agent, or Firm*—Nikaido, Marmelstein, Murray & Oram

[57] ABSTRACT

An automobile door comprises a cavity defining door body and a shock absorber consisting of a plurality of tiered foam main members, and resin foam auxiliary members disposed between and connecting the main members to form chambers open transverse to the direction along which the main members are tiered.

24 Claims, 11 Drawing Sheets

AUTOMOBILE DOOR

This is a division of application Ser. No. 07/934,827 filed Aug. 24, 1992, now U.S. Pat. No. 5,306,068.

BACKGROUND OF THE INVENTION

The present invention relates generally to a door, and particularly to a door employed in an automobile.

Automobile doors are equipped with a shock-absorbing means In order to protect the driver/passengers from collision shock in the event of an accident.

Conventionally, shock absorbers therein have been plate or block foam, or metal beams. However, the door is thus made necessarily heavy, due to the relative heaviness of such shock-absorbing materials forming the absorber which it contains. Moreover, conventional absorbers do not provide shock absorbency sufficient to meet forthcoming Motor Vehicle Safety Standard (MVSS)-307.

SUMMARY OF THE INVENTION

An object of the present invention is to improve the shock absorbing characteristics and to reduce the weight of an automobile door.

Another object of the present invention is to improve the shock absorbing characteristics of an automobile shock absorber and to lighten the absorber material.

An automobile door according to an aspect of the present invention comprises a door body defining a cavity in which a shock absorber is installed. The shock absorber is made of a plurality of interconnected tubes of resin foam, the axes of which lie in parallel. The axes of the tubes are aligned in the thickness direction of the door body.

The door in this aspect is light, since interconnected hollow tubes of resin foam form the shock absorber in the door body. Furthermore, shocks to the door are effectively absorbed by the shock absorber. The shock absorbing ability of the shock absorber is particularly high through the bulk of the door, since the axes of the shock absorber tubes extend along its thickness direction. The door thus protects a driver/passenger from the shock of a lateral collision.

The shock absorber of an automobile door according to another aspect comprises a plurality of tiered resin foam main members, and resin foam auxiliary members disposed between and connecting the main members to form chambers open transverse to the direction along which the main members are tiered.

The door in this aspect is light, since the shock-absorbing material employed as the shock absorber the door body consists of resin foam, and the auxiliary members form open-ended chambers. Shocks to the door are effectively absorbed by the shock absorber, the shock absorbing ability of which is particularly high in the thickness direction of the door, since the chambers open onto that shock-receiving direction. In this way, the door protects the driver/passengers from the shock of a lateral collision.

In a further aspect of the invention, an automobile shock absorber comprises an aggregate of interconnected resin foam tubes the axes of which lie in parallel, and a panel attached to the tubes so as to close them off at one end.

Thus formed of hollow interconnected tubes of resin foam, the shock absorber is light. The tubes provide high shock absorbency, inasmuch as they deform upon shock impact to take in the energy of the jolt; and the panel on the shock absorber provides for ease of handling.

A shock absorber in yet another aspect comprises a tiered plurality of resin foam main members, and resin foam auxiliary members disposed between and connecting the main members to form chambers open transverse to the direction along which the main members are tiered.

The shock absorber is light, since the shock-absorbing material is resin foam, and the auxiliary members form open-ended chambers. The main and auxiliary members provide good shock absorbency, taking up impacting energy upon deformation in the direction transverse to that of the tiered arrangement of the main members.

An automobile shock absorber according to a still further aspect of the present invention comprises a aggregate including tiered resin foam main members, and resin foam auxiliary members disposed between and connecting the main members, defining chambers opening transverse to the direction along which the main members are tiered; and a panel attached to the aggregate so as to close one end of the chambers.

The shock absorber is light, since the material of both the main and auxiliary members is resin foam, and the auxiliary members form open-ended chambers between the main members. The main and auxiliary members provide good shock absorbency, taking up impacting energy upon deformation; and the panel on the shock absorber provides for ease of handling.

The foregoing and other objects and advantages of the present invention will be more fully apparent from the following detailed description.

DESCRIPTION OF THE PREFERRED EMBODIMENTS

Embodiment 1

Figure 1:
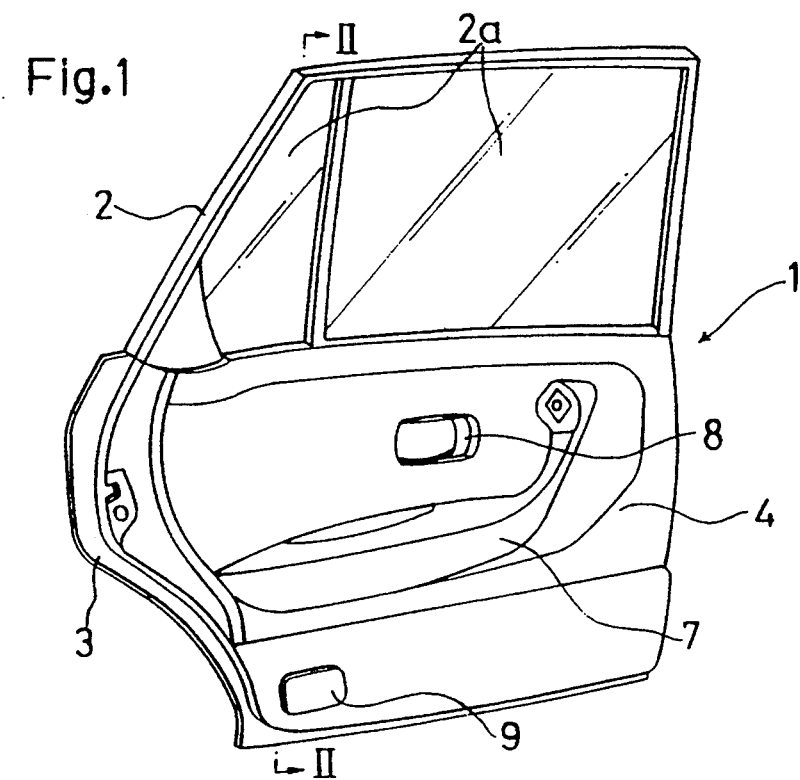
FIG. 1 is a perspective view of an automobile door according to the first embodiment of the present invention.

Shown in FIG. 1 is an automobile door 1 according to an embodiment or the present invention. The door 1 is the left rear door of an automobile, and comprises an door body 3 including a window frame 2 retaining slidable window glass 2a, and a door panel 4 attached to the inside or the door body 3.

Figure 2:
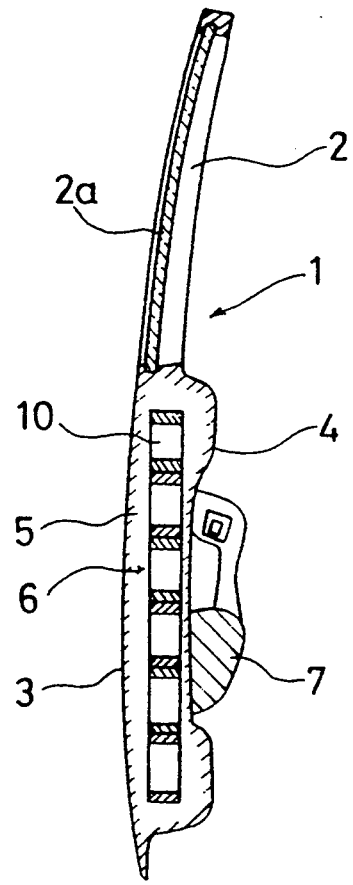
FIG. 2 is a sectional view taken along the line II—II of FIG. 1.

The door body 3 defines, as shown in FIG. 2, a cavity 5 for receiving the window glass 2a, and for containing a power-window motor (not shown), etc. The cavity 5 is filled, save for sufficient room to allow the window glass 2a to slide into the door body 3, with a shock absorber 6. On the door panel 4 there are an arm rest 7, a door handle 8 and a lamp 9.

Figure 3:
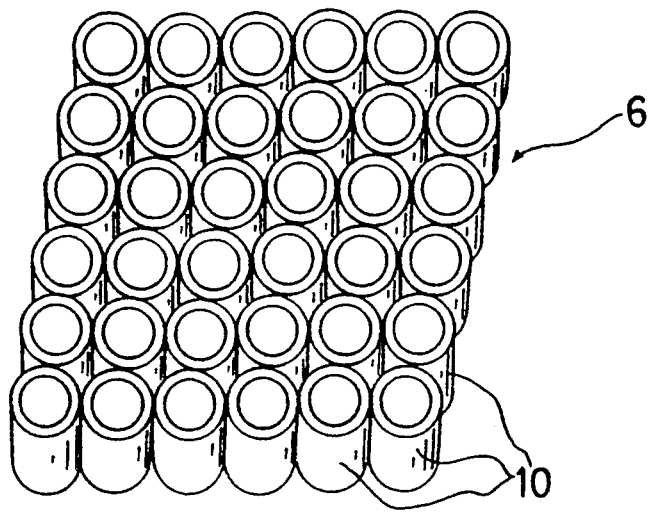
FIG. 3 is a perspective view of a shock absorber of the first embodiment.

Referring to FIG. 3, the shock absorber 6 will now be described in detail.

The shock absorber 6 in overall form is a slab consisting of a plurality or tubes 10 having parallel axes and aligned lengthwise and widthwise. Each or the tubes 10 is affixed to its contiguous neighbors.

The tubes 10 are made of resin foam. The resin may be a thermoplastic resin such as polystyrene, poloxyethylene, polypropylene or polyvinylchloride, or a thermosetting resin such as urethane or phenol resin. A thermoplastic resin foam is preferably used for the roam. Particularly, a cross-linked polypropylene resin roam is most preferable, because it has good shock-absorbing characteristics as compared with non-cross-linked resin foams. The polyolefin resin may be cross-linked by subjection to such radiation as electron rays, or by a chemical process employing a peroxide.

In order to implement good shock absorbing ability, the foam preferably has a low expansion ratio. In the range of from 5 to 50, more preferably from 10 to 20. The foam also preferably contains closed cells.

The tubes 10 have a bore diameter in the range of from 10 to 100 mm and a wall thickness in the range of from 3 to 50 mm, preferably. With bore diameters of less than 10 mm, it is impractical to produce tubes of over 3 mm wall thickness. Bore diameters greater than 100 mm would yield tubes 10 of insufficient shock-absorbing ability. With wall thicknesses less than 3 mm, sufficient shock absorbing ability cannot be obtained. Wall thicknesses greater than 50 mm complicate the process of manufacturing the tubes 10, increasing costs.

The tubes 10 are interconnected by adhesive, adhesive tape or thermofusion, and can be either spot-joined to one another, or joined along the entirety of their contiguous surfaces.

The shock absorber 6 is disposed, as shown in FIG. 2, in the door body 3 such that the axes of the tubes 10 extend in the direction of the thickness of the door body 3.

Figure 4:
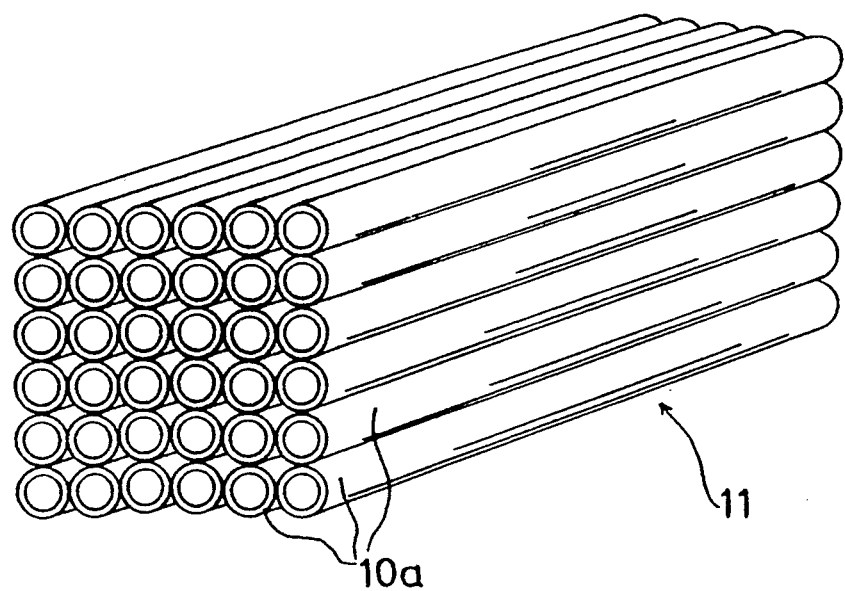
FIG. 4 is a perspective view showing a stage in manufacture of the shock absorber.

To produce the shock absorber 6; a block 11 is provided, consisting of stock tubes 10a of resin foam aligned rectilinearly as shown in FIG. 4. The block 11 is sliced through a plane which extends perpendicular to the axes of the stock tubes 10a so as to obtain tubes 10 of a predetermined thickness. The stock tubes 10a are produced by forming or bending foam sheets into tubes, or by cast-foaming or extrusion foaming.

Wherein tubes 10 interconnected by adhesive or adhesive tape are to be utilized as the shock absorber 6 the stock tubes 10a are thus joined before and in production of the block 11. On the other hand, wherein the tubes 10 are interconnected by thermofusion, the block 11 is formed by stacking the stock tubes 10a without adhesive; subsequently the block 11 is divided into shock absorber elements by a heat-ray method, by which the tubes 10 are automatically thermo-fused along the plane through which they are cut.

The aforedescribed door 1 effectively absorbs shock to its outer side (left side in FIG. 2) through the shock absorber 6. Specifically, the shock absorber 6 dissipates collision force applied to the door 1 into compression energy of the tubes 10, absorbing the shock. Accordingly, the door 1 effectively protects the driver/passengers in an automobile from shock due to lateral collision.

The door 1 is lighter than a conventional door provided with plates or blocks of foam, or with beams, since the shock absorber 6 consists of an aggregate or the lightweight tubes 10.

Following are modifications of the embodiment.

(a) The tubes 10 may be polygonal, for example triangular or square in cross section, instead of circular.

Figure 5:
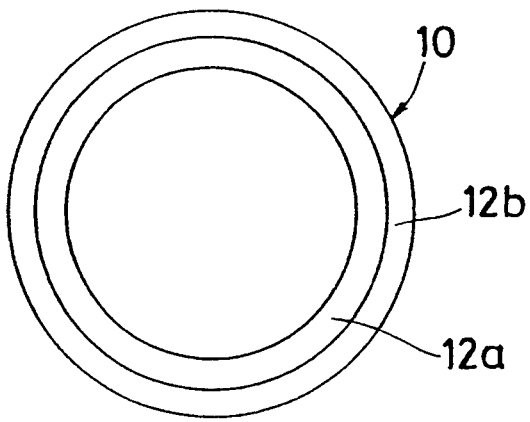
FIGS. 5, 6, 7 and 8 are cross-sectional view of respective modifications of the first embodiment.

(b) The tubes 10 may be made of a number of different resin foams. As shown in FIG. 5, a tube 10 can comprise, for example, an inner portion 12a and an outer portion 12b each made of a different resin foam. Such a tube 10 can be manufactured in the following manner: A sheet of polypropylene resin foam is laminated to a sheet of polyethylene resin foam with an adhesive or by thermofusion; the obtained laminate is then turned to form a cylindrical tube. In this case, the polypropylene resin foam may be inside or outside.

Figure 6:
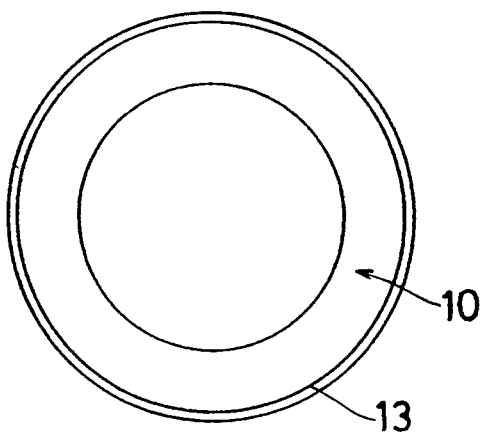
Figure 7:
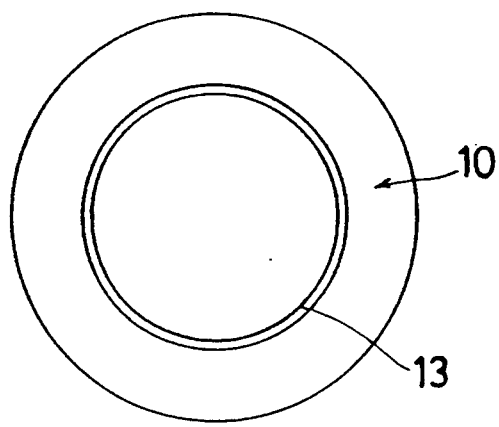
Figure 8:
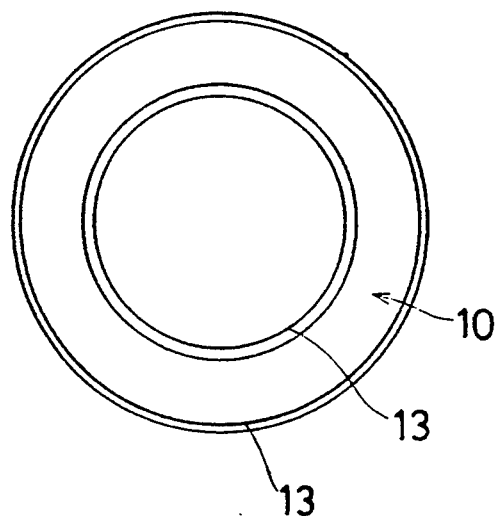

(c) Either the outer or inner surface of the tube 10, or both surfaces, may be coated by a film coating 13. The film coating 13 may be a film or sheet of a resin such as polyethylene, polypropylene, polyvinylchloride or polyester; or aluminum film, paper, fabric, nonwoven fabric, paint, etc. in FIGS. 6, 7 and 8, the thickness of the film coating 13 is shown enlarged for emphasis.

The film coating 13 provided on the inner surface and/or outer surface of the tubes 10 improves the compression strength of the shock absorber 6.

Figure 9:
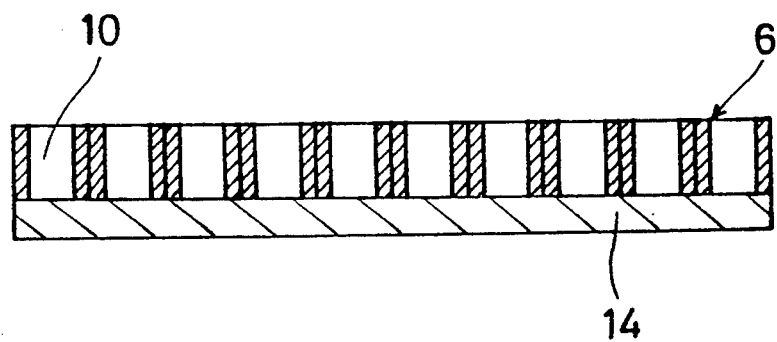
FIG. 9 is a sectional view of yet another modification.

(d) FIG. 9 shows another shock absorber 6, in this case including a panel 14 affixed to a common end of the tubes 10 by adhesive or adhesive tape, or by thermofusion. The panel 14 consists of a sheet of a resin foam such as polyethylene, polypropylene, polyvinylchloride, urethane, etc., or of nonwoven fabric, corrugated cardboard, plywood, etc.

(e) If the door body 3 defines partitioned compartments instead of a single cavity, separate shock absorbers 6 would be installed into the respective compartments.

(f) The tubes 10 of the shock absorber may be in a staggered arrangement, and may consist of several kinds of tubes 10 having different diameters.

(g) The shock absorber 6 may be installed into various automobile structures such as ceilings, floors, the bulkhead between the engine and passenger compartments, or in bumpers.

Figure 10:
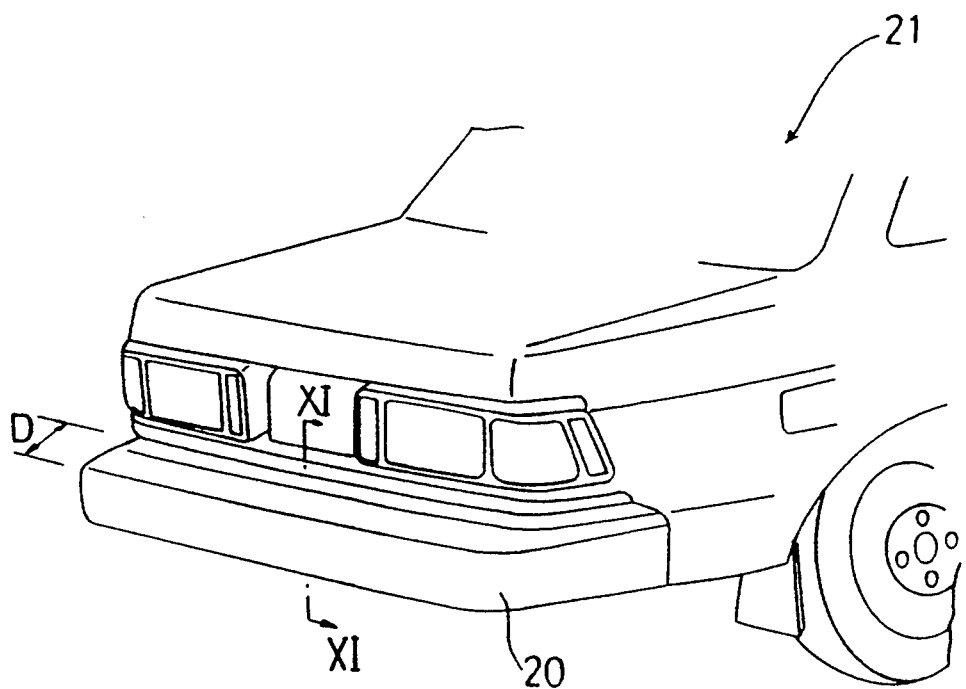
FIG. 10 is a perspective view illustrating a further modification.
Figure 11:
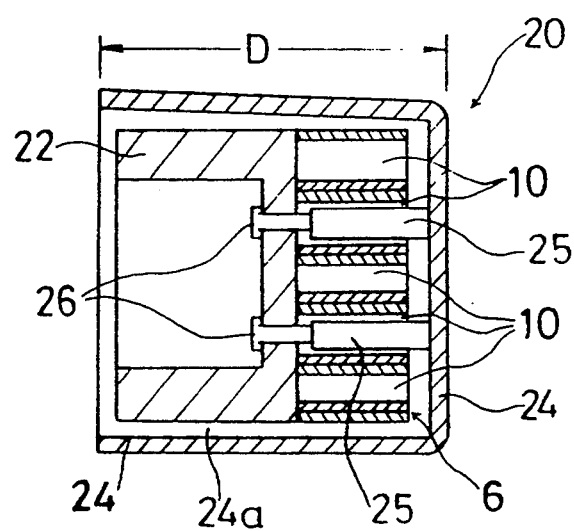
FIG. 11 is a sectional view taken along the line XI—XI of FIG. 10.

Referring to FIGS. 10 and 11, a modification of the shock absorber 6 applied to an automobile bumper will now be described. A bumper 20 is shown connected to the rear end of an automobile 21 in FIG. 10. The bumper 20, as shown in FIG. 11, essentially consists of an iron support 22, the shock absorber 6 attached onto the rear face of the support 22, and a plastic cover 24 enclosing the support 22 and the shock absorber 6. The support 22 is a block frame extending widthwise, and is fixed to the automobile 21 by brackets (not shown).

The shock absorber 6 is affixed to the support 22 such that the axes of the tubes 10 are positioned parallel to the thickness direction (direction D in FIGS. 10 and 11) of the bumper 20. The cover 24 is C-shaped in cross section, defining an interior space 24a, and contains a plurality of bosses 25 integrally formed on its inner surface. The bosses 25 are inserted into the tubes 10 and extend toward the support 22. The bosses 25 are fastened to the support 22 with bolts 26.

(Experiment 1)

Two polypropylene foamed-resin sheets of 4 mm thickness were fusion laminated, whereby a polypropylene foamed-resin sheet of about 8 mm thickness was manufactured having 0.034 g/cm$^3$ apparent density. The polypropylene foamed-resin laminate was thermoformed into stock tubes about 1 m in length and having an outside diameter of 50 mm. Thirty-six of the tubes were stacked into a metal frame (not shown) so as to form a block, as shown in FIG. 4. Then, the block is divided into shock absorber elements by a heat-ray method, in which the block is sliced at intervals of about 50 mm from its end by a heat-ray cutter. The tubes are thus affixed by thermofusion.

The apparent density of the obtained shock absorber is 0.017 g/cm$^3$ which is about half that of the foam sheet prior to thermoforming, providing a significantly lightweight shock absorber.

Figure 12:
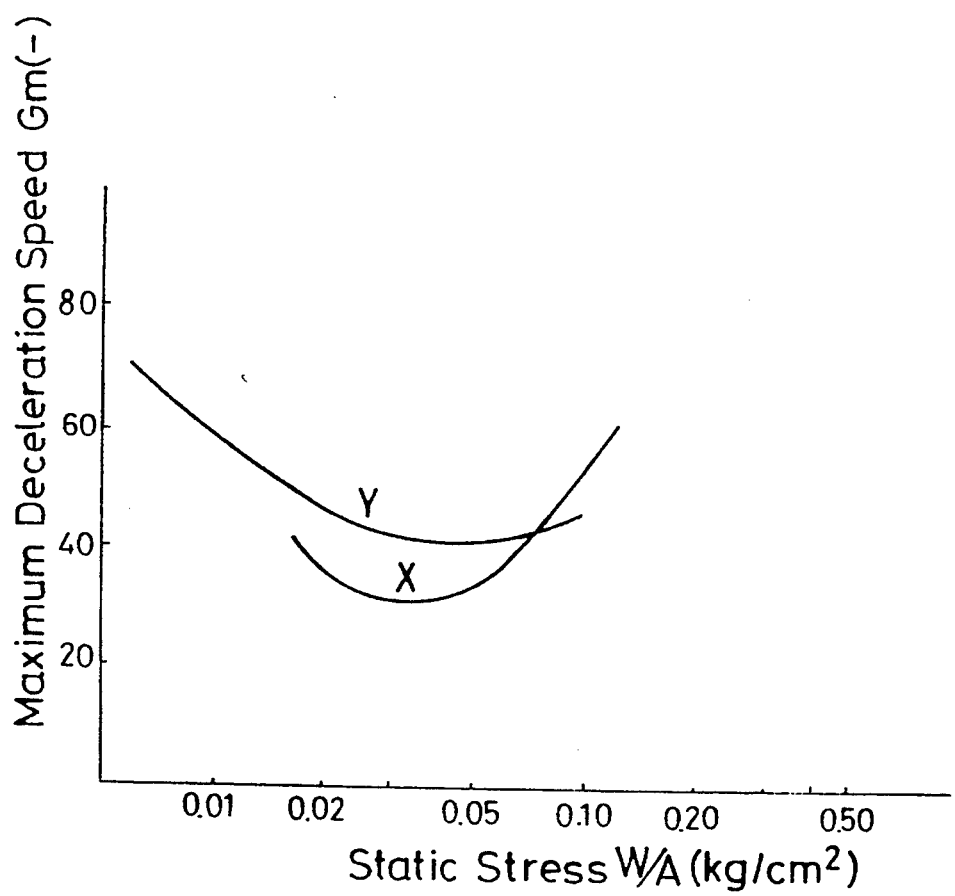
FIG. 12 is a graph illustrating shock absorbing characteristics of the shock absorber.

The shock absorbing characteristics of the shock absorber herein are indicated by X in the graph of FIG. 12. The shock absorbency was evaluated by measuring the relationship between the maximum acceleration speed $G_m$ and the static stress W/A, with parameters of bobweight dropping height H and test piece thickness T, according to Japan Industrial Standard Z0235-1970.

The shock-absorbing characteristics of a foamed-resin sheet prior to thermoforming are shown for comparison by Y in FIG. 12. As is apparent from the diagramed results, the shock absorbency of the experimental is better than that of the comparison shock absorber.

(Experiment 2)

Two polypropylene foamed-resin sheets of 4 mm thickness were laminated, whereby a polypropylene foamed-resin sheet of about 8 mm thickness was fabricated having 0.067 g/cm$^3$ apparent density. The polypropylene foamed-resin laminate was then thermoformed into stock tubes about 1 m in length and having an outside diameter of 30 mm. One-hundred of the obtained stock tubes were used in order to fabricate shock absorbers likewise as in Experiment 1. The apparent density of the shock absorber is 0.056 g/cm$^3$, which is about 1/5 that of the polypropylene foamed-resin sheet prior to thermoforming. These results demonstrate that a shock absorber lighter than that of Experiment 1 was manufactured.

Embodiment 2

Figure 13:
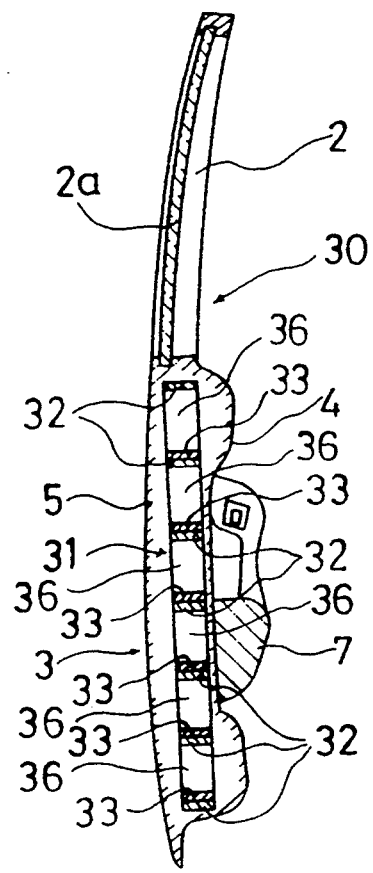
FIG. 13 is a view in the manner of FIG. 2 of a second embodiment.

FIG. 13, corresponding to FIG. 2 of the first embodiment, shows a automobile door 30 according to a second embodiment of the present invention. The door 30 is a left rear door of an automobile, and comprises the same components as the door 1 of Embodiment 1, except for shock absorber 31 installed in a cavity 5 of the door body 3.

Figure 14:
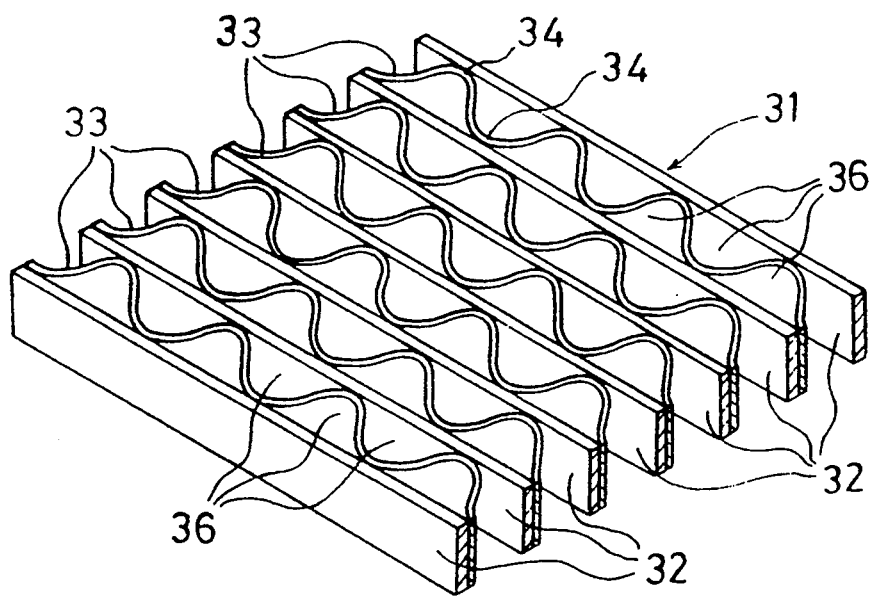
FIG. 14 is a perspective view of a shock absorber of the second embodiment.

With reference to FIG. 14, the shock absorber 31 will now be described in detail.

The shock absorber 31 consists principally of a plurality of plates 32 and a plurality of auxiliary connecting members 33.

Each of the plates 32 is a rectangular sheet of resin foam, and the plates are tiered so as to be in parallel vertically, as shown in FIG. 13.

The connecting members 33 are located between the plates 32 and interconnect them. The connecting members 33 are corrugated resin foam plates, wherein they are bonded at their ridges 34 adjacent plates 32. Thus, chambers 36 are formed, open in the thickness direction of the shock absorber 31 (normal to the direction along which the plates 32 are tiered).

The aforedescribed plates 32 and connecting members 33 are made of resin foam. The resin of the foam may be a thermoplastic resin such as polystyrene, polyethylene, polypropylene or polyvinylchloride, or a thermosetting resin such as urethane or phenol resin. A thermoplastic resin is preferably used for the foam in this embodiment. Particularly, a cross-linked polyolefin resin foam such as a cross-linked polypropylene resin foam would be most preferable, in that it has good shock-absorbing characteristics as compared with non-cross-linked resin foams. The polyolefin resin foam may be cross-linked by subjection to such radiation as electron rays, or by a chemical process employing a peroxide.

In order to implement good shock absorbing characteristics, the foam preferably has a low expansion ratio in the range of from 5 to 40, more preferably 10 to 20. The apparent density of the foam is preferably 0.20 to 0.025 g/cm$^3$, more preferably 0.100 to 0.050 g/cm$^3$. The gel percentage according to the thermotetralin extraction method is preferably 15 to 70%, more preferably 30 to 50%. It is also particularly preferable that the foam contain closed cells.

It is preferable that thickness of the plates 32 should be 3 to 16 mm, and of the connecting members 33, 4 to 8 mm. If the thickness of these elements is less than 3 mm and 4 mm respectively, the shock absorber 31 will not have good shock-absorbing characteristics. If the thickness of the elements is more than 16 mm and 8 mm respectively, the weight of the shock-absorbing material 31 increases, and the cost increases.

Various kinds of foam may be used to make the plates 32 and the connecting members 33.

The plates 32 and the connecting members 33 are integrally connected to each other by adhesive, adhesive tape or by thermofusion. The ridges 34 of the connecting members 33 can be spot-bonded to the associated plate 32, or bonded such that the whole of the area of the ridge 34 continuous with the plate 32 is bonded therewith.

The shock absorber 31 is contained, as shown in FIG. 13, in the cavity 5 of the door body 3 such that its thickness direction is in alignment with the thickness direction of the door body 3.

The aforedescribed door 30 in this embodiment effectively absorbs shock to its outer side (left side in FIG. 13) through the shock absorber 31. Specifically, the shock absorber 31 dissipates collision force applied to the door 30 into compression energy through the thickness of the absorber, absorbing the jolting shock. Accordingly, the door 30 effectively protects the driver/passengers in an automobile from shock due to lateral collision.

Since the shock absorber 31 is made of light foam, and the connecting members 33 are so connected to the plate 32 as to define chambers 36, the door 30 is lighter than a conventional door wherein the shock absorber consists of a plate foam or block foam, or metal beams.

Figure 15:
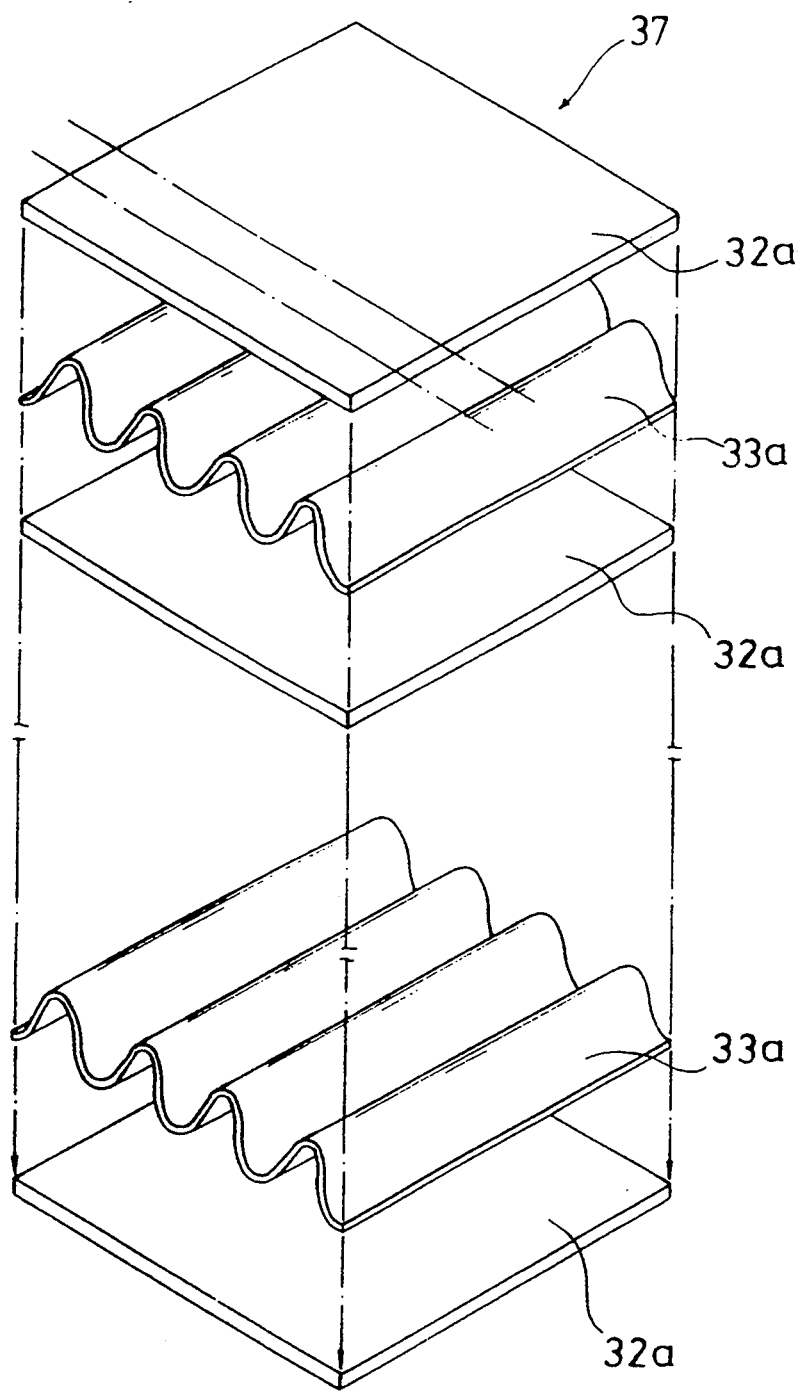
FIG. 15 is a perspective view showing a stage in manufacture of the shock absorber.
Figure 16:
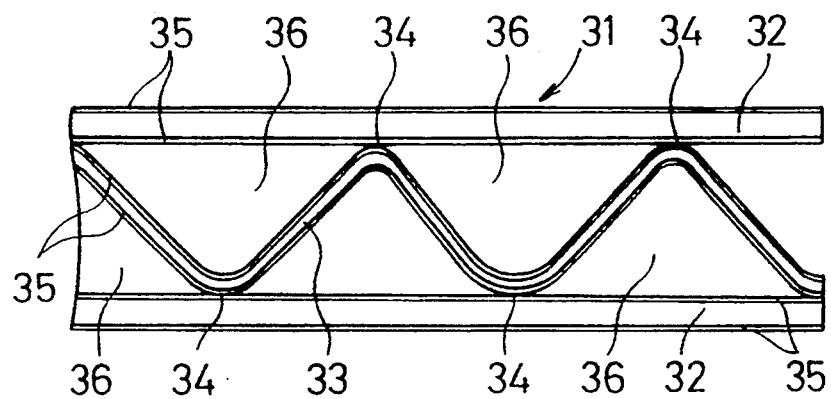
FIG. 16 is a partly in sectional view of a shock absorber according to a modification of the second embodiment.

To produce the shock absorber 31; a block 37 is prepared (FIG. 15), composed of resin foam plates 32a and corrugated stock 33a stacked in alternation. The block 37 is sliced longitudinally at intervals, along the dashed lines in the figure, thereby effectively to fabricate shock absorbers 31.

The corrugated stock 33a is produced by forming or bending foam sheets. The corrugated stock 33a can also be made by cast-foaming or special extrusion foaming. When adhesive or adhesive tape is used to bond the plates 32 and the connecting members 33, the plates 32a and the corrugated stock 33a are bonded prior to cutting. Meanwhile, wherein the shock absorber 31 is fabricated by thermofusion, the plates 32a and the corrugated stock 33a are stacked unbonded. Then, the block 37 is divided into shock absorbers 31 by the heat-ray method, in which the block 37 is cut along the dashed lines in FIG. 15, such that the plate 32a and the corrugated stock 33a are thermofused along their cutting surfaces.

Following are modifications of this second embodiment.

(a) The plates 32 and the connecting members 33 constituting the shock absorber 31 may have surfaces covered by film coating 35. The film coating 35 may be a film or sheet of a resin such as polyethylene, polypropylene, polyvinylchloride or polyester; or aluminum film, paper, fabric, nonwoven fabric, paint, etc. The film coating provided on the surfaces of the plates 32 and the connecting members 33 improves the shock absorbing characteristics of the shock absorber 31.

Figure 17:
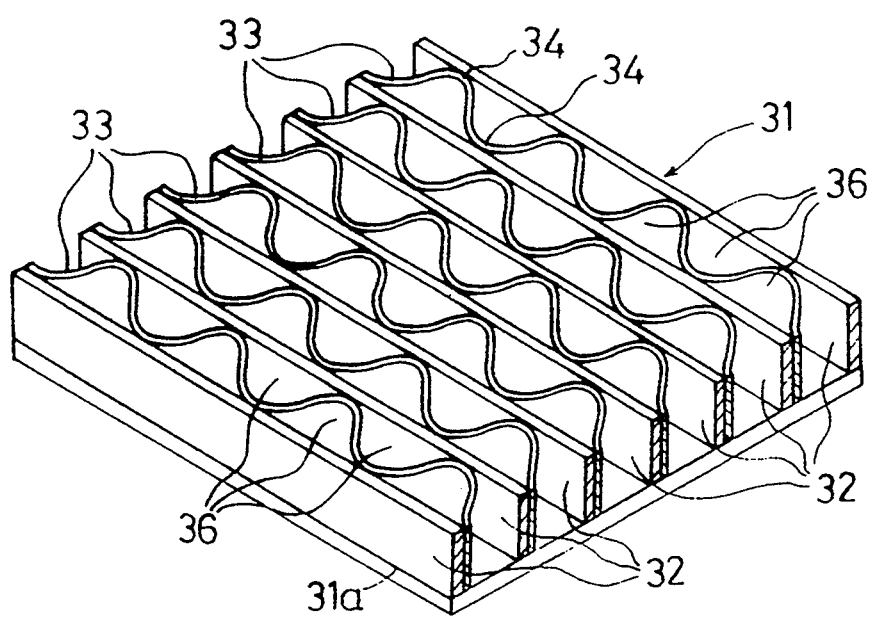
FIG. 17 is a perspective view of a shock absorber according to a further modification of the second embodiment.

(b) Another shock absorber 31 shown in FIG. 17 has a plate 31a affixed to one surface of the shock absorber 31 such that the chambers 36 are exposed. The plate 31a is made of a foam plate of resin such as polyethylene, polypropylene, polyvinylchloride, urethane, etc., nonwoven fabric, corrugated cardboard, plywood, etc. The plate 31 is affixed to the shock absorber 31 by adhesive, adhesive tape or thermofusion.

(c) If the door body 3 defines partitioned compartments instead of a single cavity, separate shock absorbers 31 would be installed into the respective compartments.

(d) The shock absorber 31 may be installed into various automobile structures such as ceilings, floors, the bulkhead between the engine and passenger compartments, or in bumpers, likewise as in the first embodiment.

Figure 18:
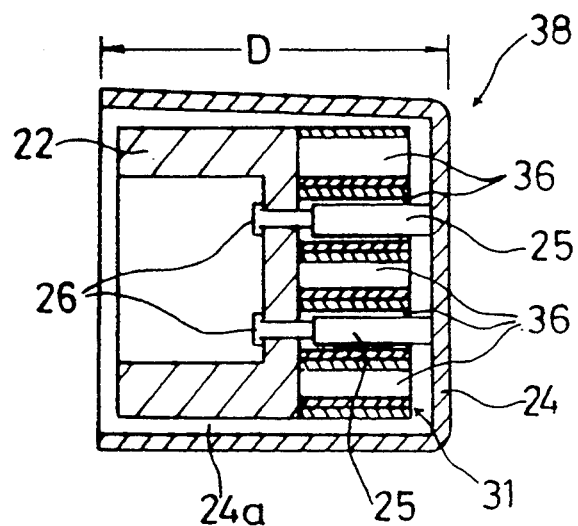
FIG. 18 is a view of the second embodiment corresponding to FIG. 10.

FIG. 18 corresponds to FIG. 10 wherein the shock absorber 31 is shown applied to an automobile bumper. The bumper 38 has the same structure as the bumper 20 in Embodiment 1, excepting for the shock absorber material itself 31. The shock absorber 31 of this bumper 38 is also bonded to the support 22 wherein the thickness direction of the shock absorber 31 is aligned with the thickness direction (direction D in FIGS. 10 and 18) of the bumper 38.

Figure 19:
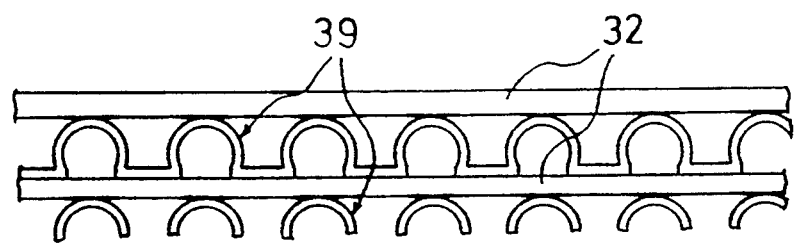
FIGS. 19 and 20 are plane partial views of a shock absorber of respective further modifications.

(e) The connecting members 33 of the shock absorber 31 need not be limited to a wave-like form. Connecting members 39 having sectionally semicircular ridges as shown in FIG. 19 and connecting members 40 having sectionally squared ridges as shown in FIG. 20 may also be used.

Figure 20:
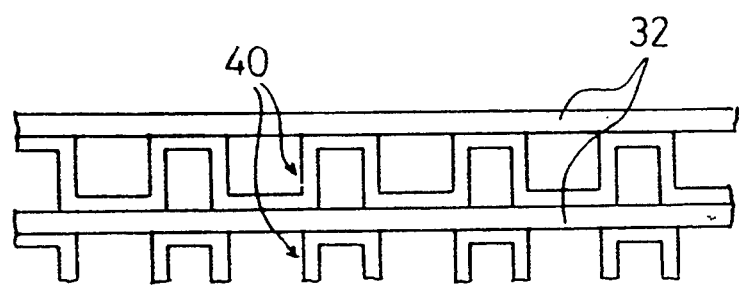
Figure 21:
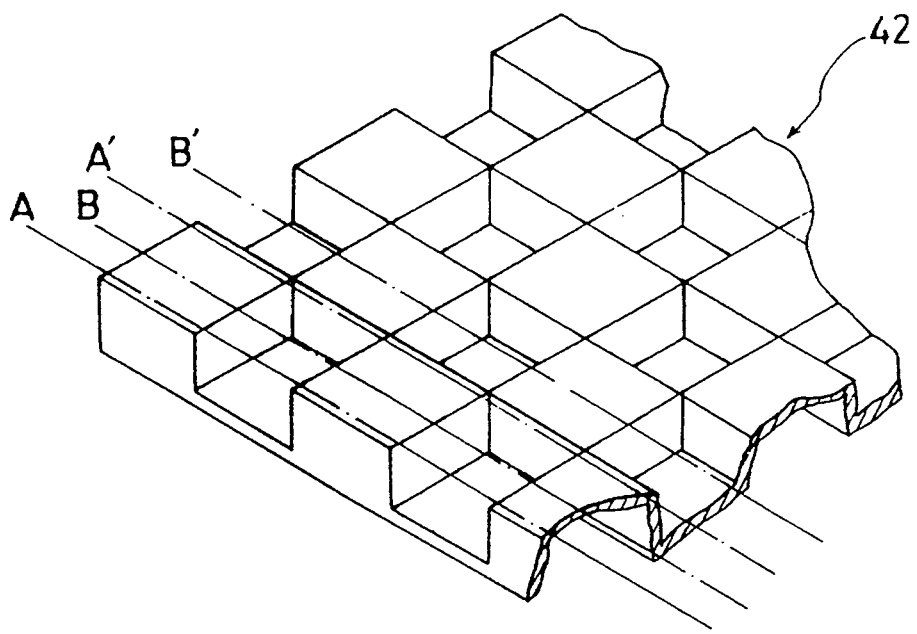
FIG. 21 is a perspective view of a member constituting the shock absorber illustrated by FIG. 20.

As shown, for example, in FIG. 20, a shock absorber with connecting members 40 can be fabricated by using the form element 42 illustrated in FIG. 21 in lieu of the corrugated stock 33a. The foam element 42 is a waffled sheet, and can be divided into shock absorbers 41 by cutting it along the dashed lines A and A' of the figure.

Figure 22:
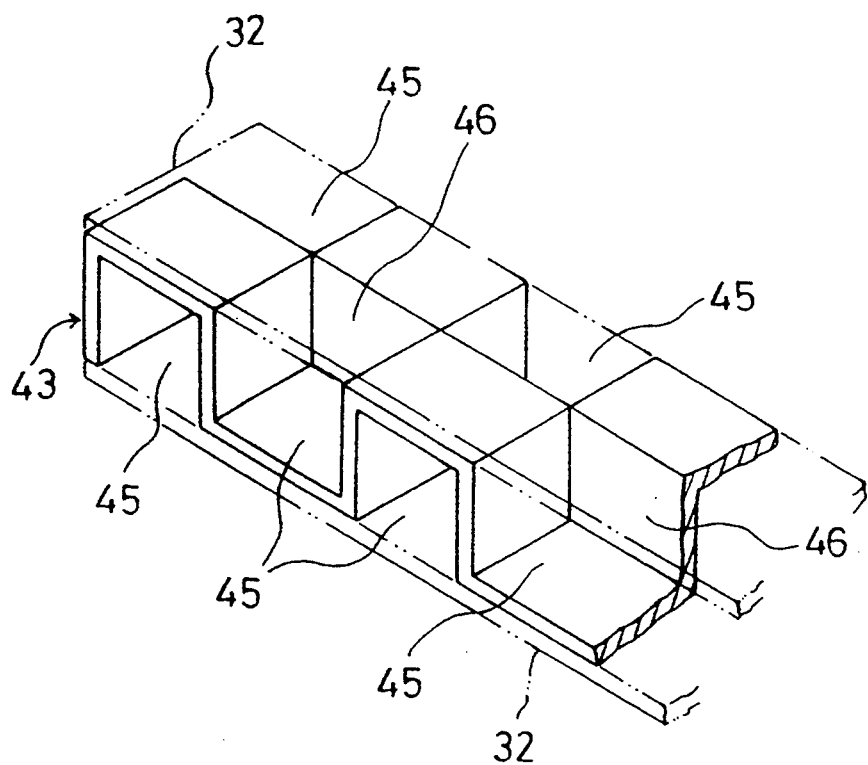
FIG. 22 is a perspective view of a shock absorber according to yet another modification of the second embodiment.

If the foam element 42 is cut along the dashed lines B and B' as shown FIG. 21, a shock absorber having connecting members 43 as shown in FIG. 22 is manufactured. Chambers 45 defined by connecting members 43 are divided midway through the thickness direction of the shock absorber by walls 46.

Various details of the invention may be changed without departing from its spirit nor its scope. Furthermore, the foregoing description of the embodiments according to the present invention provided for the purpose of the illustration only, and not for the purpose of limiting the invention as defined by the appended claims and their equivalents.

What claimed is:

1. An automobile door comprising:
a door body defining a cavity; and
a shock absorber installed in said cavity;
said shock absorber including a tiered plurality of resin foam main members, and resin foam auxiliary members disposed between and connecting adjacent of said main members such that a number of chambers are defined open transverse to a direction along which said main members are tiered.

2. A door according to claim 1, wherein said shock absorber is installed in said cavity such that said chambers open in alignment with a thickness direction of said door body.

3. A door according to claim 2, wherein said main members and auxiliary members are composed of thermoplastic resin foam.

4. A door according to claim 3, wherein said thermoplastic resin foam is a cross-linked polyolefin resin foam.

5. A door according to claim 4, wherein an expansion ratio of said cross-linked polyolefin resin foam is in the range of 5 and 40.

6. A door according to claim 5, wherein an apparent density of said cross-linked polyolefin resin foam is in the range of 0.20 g/cm$^3$ and 0.025 g/cm$^3$.

7. A door according to claim 6, wherein a gel percentage of said cross-linked polyolefin resin foam is in the range of 15% and 70%.

8. A door according to claim 7, wherein said cross-linked polyolefin resin foam contains closed cells.

9. A door according to claim 8, wherein a thickness of said main members is in the range of 3 mm and 16 mm.

10. A door according to claim 9, wherein a thickness of said auxiliary members is in the range of 4 mm and 8 mm.

11. A door according to claim 10, wherein said auxiliary members are corrugated.

12. An automobile shock absorber comprising:
a tiered plurality of foamed-resin main members; and auxiliary members disposed between and connecting each of said main members;

said auxiliary members defining a plurality of chambers open transverse to a direction along which said main members are tiered.

13. A shock absorber according to claim 12, wherein said main members and auxiliary members are composed of thermoplastic resin foam.

14. A shock absorber according to claim 13, wherein said thermoplastic resin foam is a cross-linked polyolefin resin foam.

15. A shock absorber according to claim 14, wherein an expansion ratio of said cross-linked polyolefin resin foam is in the range of 5 and 40.

16. A shock absorber according to claim 15, wherein an apparent density of said cross-linked polyolefin resin foam is in the range of 0.20 g/cm$^3$ and 0.025 g/cm$^3$.

17. A shock absorber according to claim 16, wherein a gel percentage of said cross-linked polyolefin resin foam is in the range of 15% and 70%.

18. A shock absorber according to claim 17, wherein said cross-linked polyolefin resin foam contains closed cells.

19. A shock absorber according to claim 18, wherein a thickness of said main members is in the range of 3 mm and 16 mm.

20. A shock absorber according to claim 19, wherein a thickness of said auxiliary members is in the range of 4 mm and 8 mm.

21. A shock absorber according to claim 20, wherein said auxiliary members are corrugated.

22. A shock absorber according to claim 21, wherein said main members and auxiliary members have film-coated surfaces.

23. A shock absorber according to claim 20, wherein said auxiliary members have sectionally semicircular ridges.

24. A shock absorber according to claim 20, wherein said auxiliary members have sectionally square ridges.

* * * * *